United States Patent
Nakane et al.

(10) Patent No.: US 7,164,630 B2
(45) Date of Patent: Jan. 16, 2007

(54) OPTICAL DISK APPARATUS

(75) Inventors: Hiroshi Nakane, Fukaya (JP); Takeshi Nakano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 611 days.

(21) Appl. No.: 10/352,882

(22) Filed: Jan. 29, 2003

(65) Prior Publication Data

US 2003/0142599 A1 Jul. 31, 2003

(30) Foreign Application Priority Data

Jan. 31, 2002 (JP) ............................. 2002-024761

(51) Int. Cl.
*G11B 7/095* (2006.01)
(52) U.S. Cl. .............................. 369/44.32; 369/44.35; 369/53.15
(58) Field of Classification Search ............ 369/44.32, 369/44.35, 44.37, 53.15, 53.23
See application file for complete search history.

(56) References Cited

U.S. PATENT DOCUMENTS

| | | | | |
|---|---|---|---|---|
| 4,520,469 A | * | 5/1985 | Todokoro et al. | 369/44.34 |
| 4,703,468 A | * | 10/1987 | Baba et al. | 369/44.35 |
| 4,953,151 A | * | 8/1990 | Imanaka | 369/53.24 |
| 5,633,845 A | * | 5/1997 | Horiguchi | 369/44.38 |
| 5,828,637 A | * | 10/1998 | Kim | 369/44.32 |
| 5,841,751 A | | 11/1998 | Komazaki et al. | |
| 6,438,098 B1 | * | 8/2002 | Nakajima et al. | 369/53.1 |
| 6,493,296 B1 | * | 12/2002 | Fukumoto et al. | 369/44.32 |

FOREIGN PATENT DOCUMENTS

| | | |
|---|---|---|
| CN | 1173013 A | 2/1998 |
| JP | 58150144 | 9/1983 |
| JP | 62112236 | 5/1987 |
| JP | 5325234 | 12/1993 |
| JP | 10124900 | 5/1998 |
| JP | 11-175989 | 7/1999 |

OTHER PUBLICATIONS

Copy of Notification of Reasons for Rejection issued in Japanese Patent Application No. 2002-024761 dated Mar. 11, 2004 (and English translation) on which the instant application relies for priority.
Copy of Notification of the First Office Action issued in People's Republic of China Patent Office, dated Jun. 4, 2004 for Patent Application No. 03102316.9.

* cited by examiner

*Primary Examiner*—Andrea Wellington
*Assistant Examiner*—Nathan Danielsen
(74) *Attorney, Agent, or Firm*—Pillsbury Winthrop Shaw Pittman, LLP

(57) ABSTRACT

A Differential Phase Detecting (DPD) tracking error generating section generates a DPD tracking error signal from a plurality of sense signals supplied from an optical sensor. A Push Pull (PP) tracking error generating section generates a PP tracking error signal from a plurality of sense signals supplied from the optical sensor. The amplitude of each of the DPD tracking error signal and PP tracking error signal is adjusted suitably under the control of a CPU. The suitably adjusted signals are added by an adder, thereby generating a tracking error signal.

5 Claims, 9 Drawing Sheets

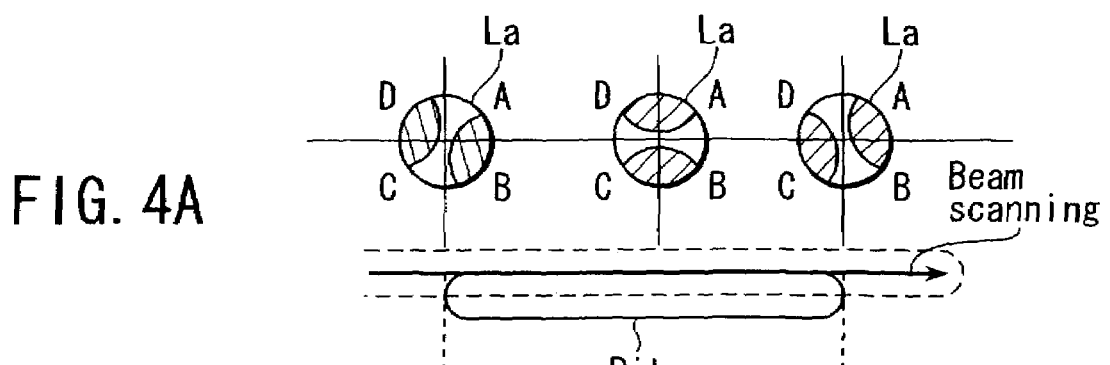
FIG. 4A
FIG. 4B
FIG. 4C
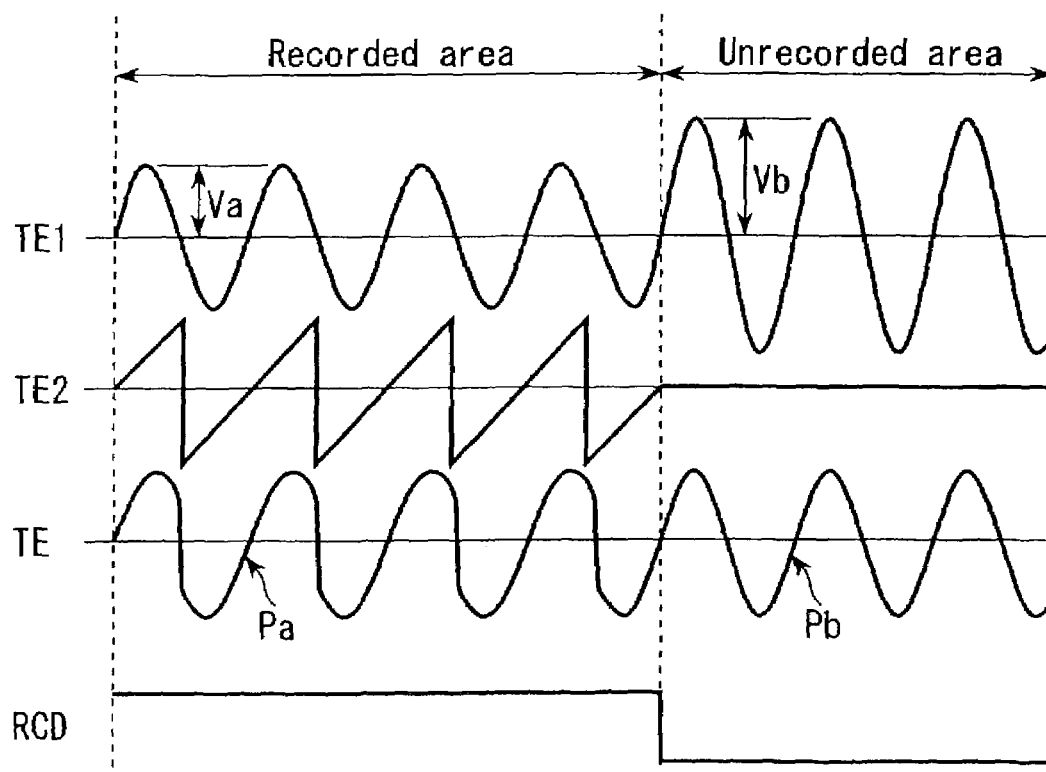
FIG. 5

OPTICAL DISK APPARATUS

CROSS-REFERENCE TO RELATED APPLICATIONS

This application is based upon and claims the benefit of priority from the prior Japanese Patent Application No. 2002-24761, filed Jan. 31, 2002, the entire contents of which are incorporated herein by reference.

BACKGROUND OF THE INVENTION

1. Field of the Invention

This invention relates to an optical disk recording and reproducing apparatus which projects a light beam onto a rotating optical disk and records and reproduces the information, and more particularly to the tracking servo technique for causing the light beam to trace a track on the optical disk accurately.

2. Description of the Related Art

In an optical disk recording and reproducing apparatus, for the light beam to trace accurately a track where pits representing information are arranged in a row, a tracking servo is indispensable which generates a tracking signal and performs position control of the pickup across the radius of the disk on the basis of the tracking signal.

In a read-only optical disk, such as a DVD-ROM, pits representing information are recorded in the form of holes by press working. In a recordable optical disk, such as a DVD-RAM, a groove is formed in a spiral in such a manner that a groove as a concave portion and a land as a convex portion form a track. Projecting a beam onto the track causes pits representing information to be recorded in the form of phase changes at the disk surface. The beam reflected from the optical disk is received by an optical sensor composed of a plurality of light sensing cells. The light sensing cells each generate optical sense signals. Using these optical sense signals, a tracking error signal is generated.

A method of generating a tracking error signal includes a Differential Phase Detection (hereinafter, referred to as DPD) scheme and a Push Pull (hereinafter, PP) scheme. In the DPD scheme, a tracking error signal is generated on the basis of the phase difference between the optical sense signals outputted from the optical sensor. In the PP scheme, a tracking error signal is generated on the basis of the level difference between the optical sense signals outputted from the optical sensor.

The above-described conventional techniques, however, have the following drawbacks.

In the DPD scheme, a tracking error signal is generated using the diffraction of light by pits. Therefore, since no pit is formed in an unrecorded disk, it is impossible to generate a tracking error signal. Use of the phase difference permits a seriously erroneous tracking error signal to be generated, if there is a flaw at the disk surface, which leads to a faulty operation, such as track skipping.

In the PP scheme, the intensity of the reflected light in a recorded track differs from that in an unrecorded track, which results in the difference between tracking error signals. This makes the tracking servo unstable.

BRIEF SUMMARY OF THE INVENTION

It is accordingly an embodiment of the present invention to provide an optical disk apparatus capable of generating a stable tracking error signal, even when an optical disk has recorded areas and unrecorded areas mixed on it, or when there are variations in the depth of pits or flaws in the disk.

According to an aspect of the present invention, there is provided an optical disk apparatus used as one of an apparatus for reproducing information, and an apparatus for recording and reproducing information, by projecting a light beam onto an optical disk, said optical disk apparatus comprising: an optical sensor which is composed of at least of one light sensing cell and which receives the light reflected from an optical disk and outputs optical sense signals corresponding to said light received; a first tracking error generating section which senses a phase difference between said optical sense signals outputted from said optical sensor and which generates a first tracking error signal from said optical sense signals; a second tracking error generating section which senses a level difference between said optical sense signals outputted from said optical sensor and which generates a second tracking error signal from said optical sense signals; a combining section which combines the first tracking error signal generated by said first tracking error generating section and the second tracking error signal generated by said second tracking error generating section and outputs the combined tracking signal; and a tracking control section which performs tracking control using the combined tracking signal supplied from said combining section.

Using the DPD tracking error generating section and the PP tracking error generating section at the same time enables the tracking to be controlled, while compensating for each other's drawbacks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 4A to 4C show the output signals from adders 96c and 96d when the light beam scans pits in the disk;

FIG. 5 shows each signal waveform of FIG. 3 when the light beam is projected onto a rotating recordable optical disk;

DETAILED DESCRIPTION OF THE INVENTION

Figure 1:
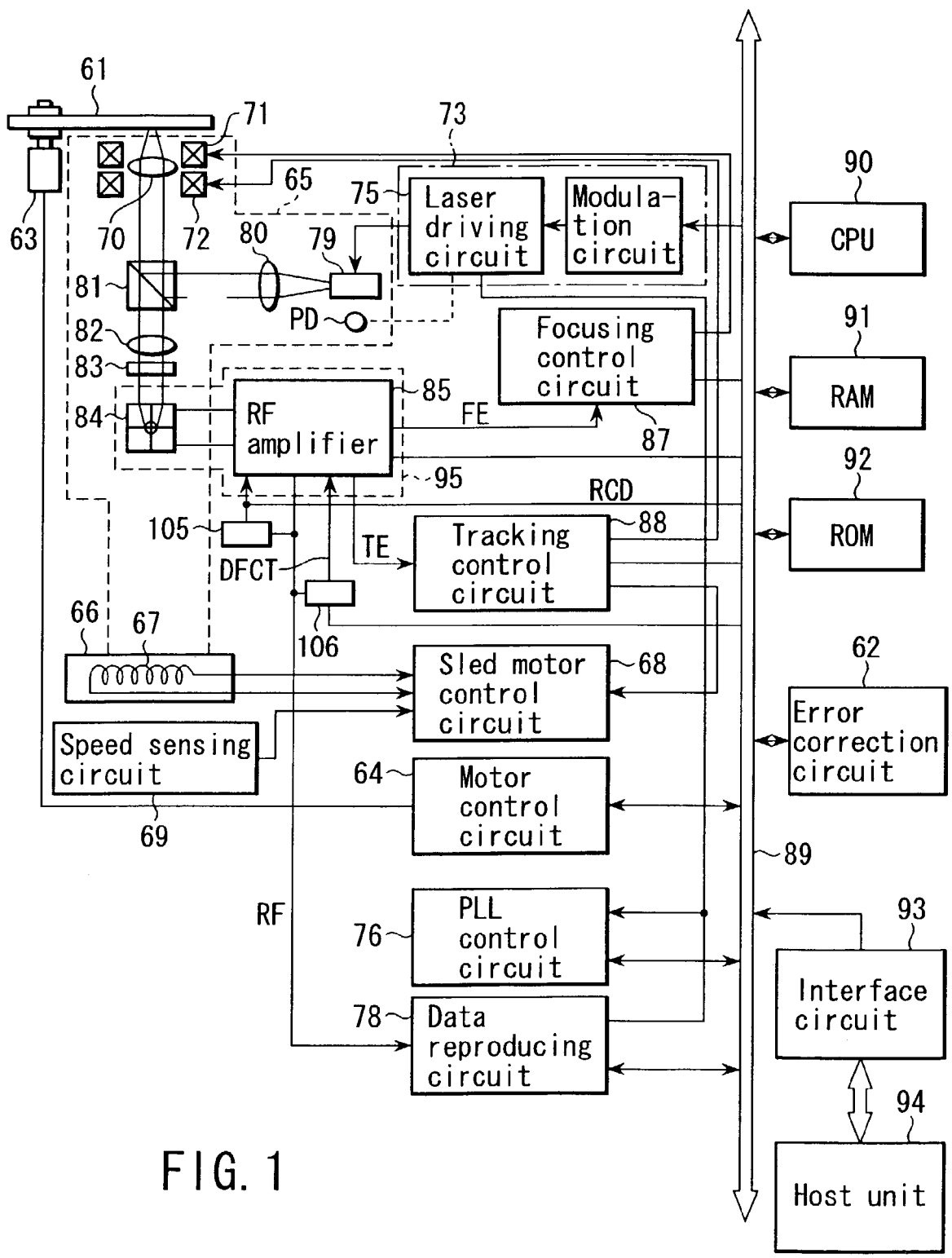
FIG. 1 is a block diagram showing the configuration of an optical disk apparatus to which the present invention is applied.

Hereinafter, referring to the accompanying drawings, embodiments of the present invention will be explained in detail. FIG. 1 is a block diagram showing the configuration of an optical disk apparatus to which the present invention is applied.

At the surface of an optical disk 61 serving as a recording medium, tracks are formed in a spiral. The disk 61 is rotated by a spindle motor 63.

An optical pickup head (hereinafter, referred to as a PUH) 65 records and reproduces information onto and from the optical disk 61. The PUH 65 is coupled with a sled motor 66 via a gear. The sled motor 66 is controlled by a sled motor control circuit 68.

A speed sensing circuit 69 is connected to the sled motor control circuit 68. The speed signal of the PUH 65 sensed by the speed sensing circuit 69 is sent to the sled motor control circuit 68. The fixed section of the sled motor 66 is provided with a permanent magnet. When a driving coil 67 is excited by the sled motor control circuit 68, the PUH 65 moves radially across the optical disk 61.

The PUH 65 is provided with an object lens 70 supported by a wire or a leaf spring (not shown). The object lens 70 can be moved in the focusing direction (or in the direction of the optical axis of the lens) by the driving of a driving coil 71. The object lens 70 can also be moved in the tracking direction (or the direction perpendicular to the optical axis of the lens) by the driving of a driving coil 72.

A laser driving circuit 75 in a laser control circuit 73 causes a semiconductor laser diode 79 to emit laser light. The laser light emitted from the semiconductor laser diode 79 passes through a collimator lens 80, a half prism 81, and the object lens 70 and is projected onto the optical disk 61. The light reflected from the optical disk 61 passes through the object lens 70, the half prism 81, a condenser lens 82, and a cylindrical lens 83 and is directed to an optical sensor 84.

The optical sensor 84 is composed of, for example, four quadrant light-sensing cells. The sense signals from the light-sensing cells are outputted to an RF amplifier 85 of the present invention. The RF amplifier 85 processes the signals from the light sensing cells and generates a focus error signal FE representing the difference from the focus, a tracking error signal TE representing the difference between the beam spot center of the laser light and the track center, and an RF signal or a total add signal of the light sensing cell signals.

The focus error signal FE is supplied to a focusing control circuit 87. The focusing control circuit 87 generates a focus driving signal according to the focus error signal FE. The focus driving signal is supplied to the focusing driving coil 71. As a result, focus servo is achieved. In the focus servo, the laser light is always properly focused on the recording film of the optical disk 61.

The tracking error signal TE is supplied to a tracking control circuit 88. The tracking control circuit 88 generates a track driving signal according to the tracking error signal TE. The track driving signal outputted from the tracking control circuit 88 is supplied to the tracking driving coil 72. With the tracking servo, the laser light is made to always trace a track formed on the optical disk 61.

With the focus servo and the tracking servo, changes in the reflected light from the pits formed in the tracks on the optical disk 61 according to the recorded information are reflected in the total add signal RF of the output signals from the light sensing cells of the optical sensor 84. The resulting signal is supplied to a data reproducing circuit 78. The data reproducing circuit 78 reproduces the recorded data on the basis of a reproducing clock signal from a PLL circuit 76.

When the tracking control circuit 88 is controlling the object lens 70, the sled motor control circuit 68 controls the sled motor 66 or PUH 65 in such a manner that the object lens 70 is located near a specific position in the PUH 65.

The motor control circuit 64, the sled motor control circuit 68, the laser control circuit 73, the PLL circuit 76, the data reproducing circuit 78, the focusing control circuit 87, the tracking control circuit 88, and error correction circuit 62 are controlled by a CPU 90 via a bus 89. The CPU 90 controls the optical disk apparatus comprehensively according to an operation command supplied from a host unit 94 via an interface circuit 93. The CPU 90 uses a RAM 91 as a work area and carries out a specific operation according to programs including the present invention recorded in a ROM 92.

Figure 2:
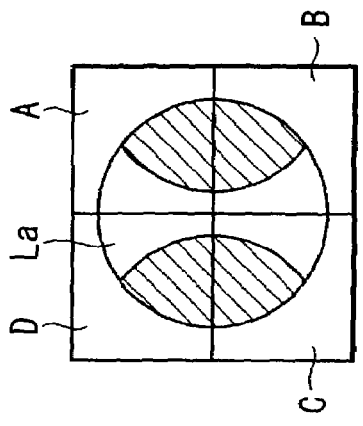
FIGS. 2A and 2B show a state where an information reproducing light beam is projected onto an optical disk.

FIG. 2A shows a state where a reproducing beam or an information reproducing light beam is projected onto the optical disk. A concave portion of the optical disk represents a pit when the disk is a read-only disk, such as a DVD-ROM. In the case of a recordable optical disk, such as a DVD-RAM, a concave portion of the optical disk represents a groove. In FIG. 2A, the beam is impinging on a phase-changed pit in a case of a DVD-RAM. Light reflects in the same manner from both a read-only disk and a recordable disk.

When the reproducing beam scans over pits in the optical disk, the beam is diffracted by the pits. The diffracted beam includes the reflected light La reflected at the top surface of a pit and the diffracted light Lb diffracted at the pit. Since there arises a phase difference between the reflected light La and the diffracted light Lb because of the diffraction of the pit, they interfere with each other and partially cancel each other, which causes shadows, as shown at the top of FIG. 2A.

Hereinafter, a method of generating a DPD tracking error signal (a first tracking error signal) will be explained. When the beam spot is scanned away from the center of the pit train, the position where the shadows appear shifts as shown by the arrow b in FIG. 2A. At the pickup, quadrant detectors A, B, C, and D receive the light reflected from the disk and generate a tracking error signal from changes in the optical sense output signal generated as a result of the movements of the shades.

Next, a method of generating a PP tracking error signal (a second tracking error signal) will be explained. When the beam spot deviates from the track center, the distribution of light intensity of the right and left lights sandwiching the track between them changes. At the pickup, the quadrant detectors A, B, C, and D in FIG. 2B receive the reflected light and sense the intensity difference between $(V_A+V_D)$ and $(V_B+V_C)$, thereby generating a tracking error signal (where $V_A$ to $V_D$ represent the sense outputs of detectors A to D, respectively).

Figure 3:
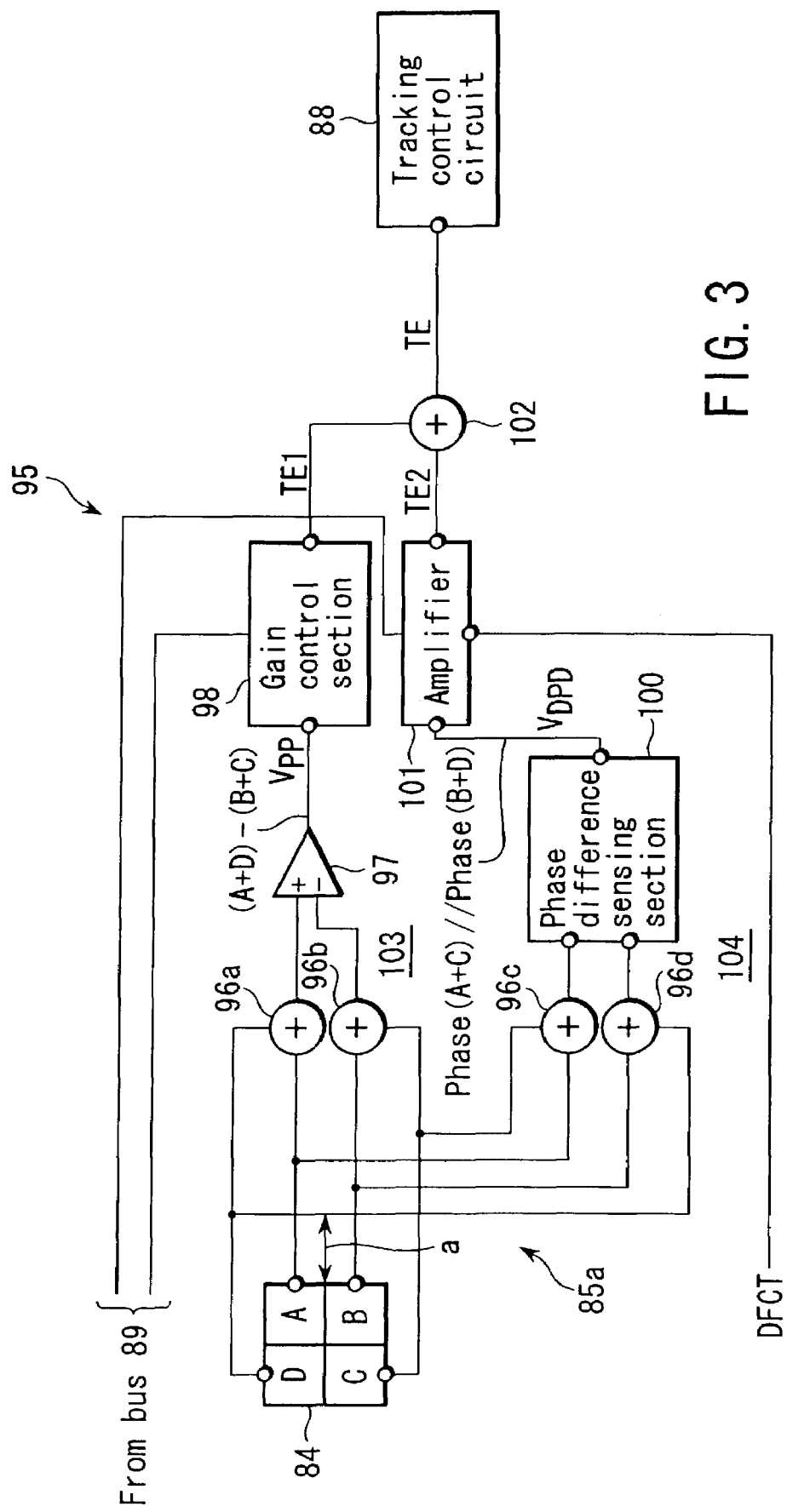
FIG. 3 is a block diagram showing the configuration of a tracking error signal generating circuit 85a of the present invention.

FIG. 3 is a block diagram showing the configuration of a tracking error signal generating circuit 85a of the present invention in the RF amplifier 85 of FIG. 1. The tracking error signal generating circuit 85a, which receives the output signals of detectors A to D from the optical sensor 84, generates a tracking error signal TE and outputs the tracking error signal TE to the tracking control circuit 88. In FIG. 3, the arrow a indicates the direction of the tangent to the track.

Adders 96a, 96b and a subtracter 97 constitute a PP tracking error signal generating circuit 103. The PP tracking error signal generating circuit 103 senses how much the reflected light deviates from the center of the optical sensor 84 in the direction of the radius of the disk.

The adder 96a adds the optical sense signals of detectors D and A. The adder 96b adds the optical sense signals of detectors C and B. The subtracter 97 produces the level difference between the sum signals from the adders 96a and 96b and outputs the level difference as a PP tracking error signal $V_{PP}$. A gain control section 98 adjusts the gain of the PP tracking error signal $V_{PP}$ and outputs a tracking error signal TE1.

The amplitude of the PP tracking error signal $V_{PP}$ varies, depending on optical factors as described later. The gain control section 98 is for compensating for variations in the amplitude.

Adders 96c and 96d and a phase difference sensing section 100 constitute a DPD tracking error signal generating circuit 104. The adder 96c adds the optical sense signals of detectors A and C. The adder 96d adds the optical sense signals of detectors B and D.

FIG. 4 shows the output signals of the adders 96c and 96d when the light beam scans pits in the disk. For example, when the light beam scans the optical disk 61, with the center of the light beam deviating from the center of the pit (in FIG. 4, the center of the light beam deviating upward from the center of the pit), the dark portions (in the figure, the shaded portions) of the reflected light La entering the optical sensor 84 rotate as shown in FIG. 4. At this time, the added output of detectors A and C, or the output of the adder 96c, changes as shown in FIG. 4B. In addition, the added output of detectors B and D, or the output of the adder 96d, changes as shown in FIG. 4C. The signal waveforms shown in FIGS. 4B and 4C are the signals obtained by binarizing the added signals of the adders 96c and 96d using specific threshold values, respectively. The phase difference sensing section 100 outputs the time difference At between the amplitude changing points of the sum signals of the adders 96c and 96d, that is, the phase difference between both signals, as a DPD tracking error signal $V_{DPD}$.

An amplifier 101 amplifies the DPD tracking error signal $V_{DPD}$ and outputs a tracking error signal TE2. An adder 102 adds the output signal of the amplifier 101 and the output signal of the gain control section 98, thereby generating a tracking error signal TE.

FIG. 5 shows each signal waveform when tracks are formed by lands and grooves of a DVD-R or the like and a light beam is projected onto a rotating recordable optical disk. Tracking control is performed in a state where the focusing control circuit puts the focus servo in the ON state (or in the just focus state). Since the light beam traverses each track in the early stages of tracking control, the PP tracking error signal $V_{PP}$ takes a sine waveform as shown in FIG. 5. In the PP tracking error signal $V_{PP}$ (TE1), the amplitude of the signal is larger in an unrecorded area than in a recorded area. This is because the intensity of the reflected light is higher in an unrecorded area than in a recorded area. On the other hand, the DPD tracking error signal $V_{DPD}$ (TE2) takes a triangular waveform as shown in FIG. 5. In an unrecorded area, the amplitude of the signal is close to 0V. This is because no pit is formed in an unrecorded area.

Figure 6:
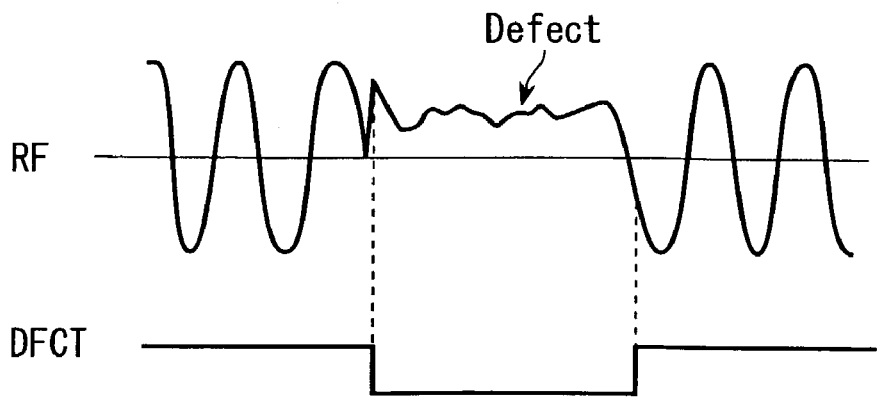
FIG. 6 shows the operation of a defect sensing section 106.

A control signal DFCT is inputted to the amplifier 101. The control signal DFCT is for muting the DPD tracking error signal $V_{DPD}$ in setting the gain of the gain control section 98 at the time when a flaw in the disk surface is sensed or at the time of initialization. A defect sensing section 106 senses a defect, such as a flaw, in the optical disk 61 from the total add signal RF of the photo sensor 84 as shown in FIG. 6. The control signal DFCT is outputted directly from the defect sensing section 106 (see FIG. 1) when a defect in the disk is sensed. At the time of initialization, the control signal DFCT is outputted from the CPU 90 via the defect sensing section 106. from the CPU 90 via the defect sensing section 106.

In the PP scheme, since the intensity of the reflected light fluctuates, depending on optical factors, such as recorded areas or unrecorded areas on the optical disk, the depth of the pits or grooves in the disk, or the inclination of the disk, the amplitude of the tracking error signal varies. To overcome this problem, the amplifier 101 is controlled by the control signal to mute the DPD tracking signal in such a manner that the output of the gain control section 98 has the optimum gain.

Figure 7:
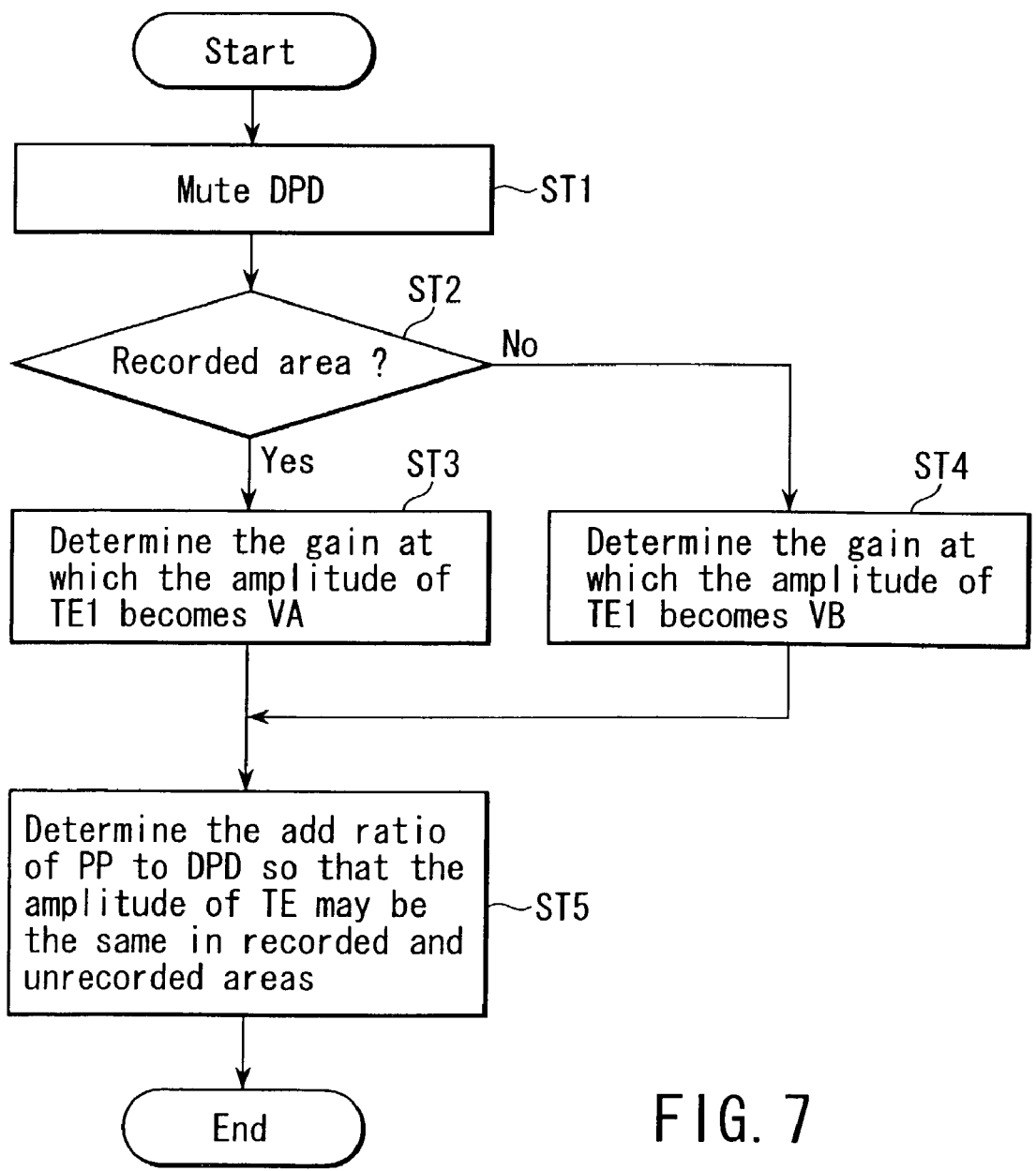
FIG. 7 is a flowchart for the initializing operation of an optical disk apparatus to which the present invention is applied.

FIG. 7 is a flowchart for the initializing operation of an optical disk apparatus to which the present invention is applied. First, the CPU 90 mutes the DPD tracking error signal $V_{DPD}$ (ST1). In this case, the CPU 90 transmits the control signal to the amplifier 101. As a result, the output signal of the amplifier 101 becomes 0V.

Next, in step ST2, if a recording/unrecording signal RCD from a recording/unrecording sensing section 105 (see FIG. 1) represents a recorded area, control is passed to step ST3, whereas if the signal RCD represents an unrecorded area, control proceeds to step ST4. From the total add signal RF from the optical sensor 84, the recording/unrecording sensing section 105 determines whether the area on which the light beam is projected is an information-recorded area or not. For example, when the maximum amplitude of the total add signal RF exceeds a specific threshold value, the recording/unrecording sensing section 105 makes the recording/unrecording signal RCD high as shown in FIG. 5.

When the light beam is scanning a recorded area, the CPU 90 sets the gain of the gain control section 98 so that the maximum amplitude Va of the PP tracking error signal $V_{PP}$ may become a specific maximum amplitude VA (ST3). When the light beam is scanning an unrecorded area, the CPU 90 sets the gain of the gain control section 98 so that the maximum amplitude Vb of the PP tracking error signal $V_{PP}$ may become a specific maximum amplitude VB (ST4).

Next, the CPU 90 cancels the muting of the amplifier 101 (or makes the control signal DFCT inactive) and sets the gain of the amplifier 101 so that the tracking error signals TE1 and TE2 may be added at the adder 102 in the optimum addition ratio (ST5). That is, the CPU 90 sets the gain of the amplifier 101 so that the maximum amplitude of the tracking error signal TE may be the same in both a recorded area and an unrecorded area, or so that the inclination of the signal at the zero cross point Pa at which the signal goes from negative to positive may be equal to the inclination of the signal at the zero cross point Pb.

In a normal recording or reproducing operation, it is possible to generate a tracking error signal with almost the same amplitude in the recorded area and the unrecorded area on the optical disk. This enables a precise tracking servo.

With the present invention, since the signal obtained by combining the DPD signal and the PP signal is used as the final tracking error signal, it is possible to realize a stable tracking servo, regardless of fluctuations in the optical factors. This enables the recording medium to be operated stably even when a recorded area and an unrecorded area on the medium are searched at high speed.

When there is a flaw in the surface of the disk, muting the DPD tracking error signal by the control signal DFCT enables a tracking servo immune to the flaw.

Figure 8:
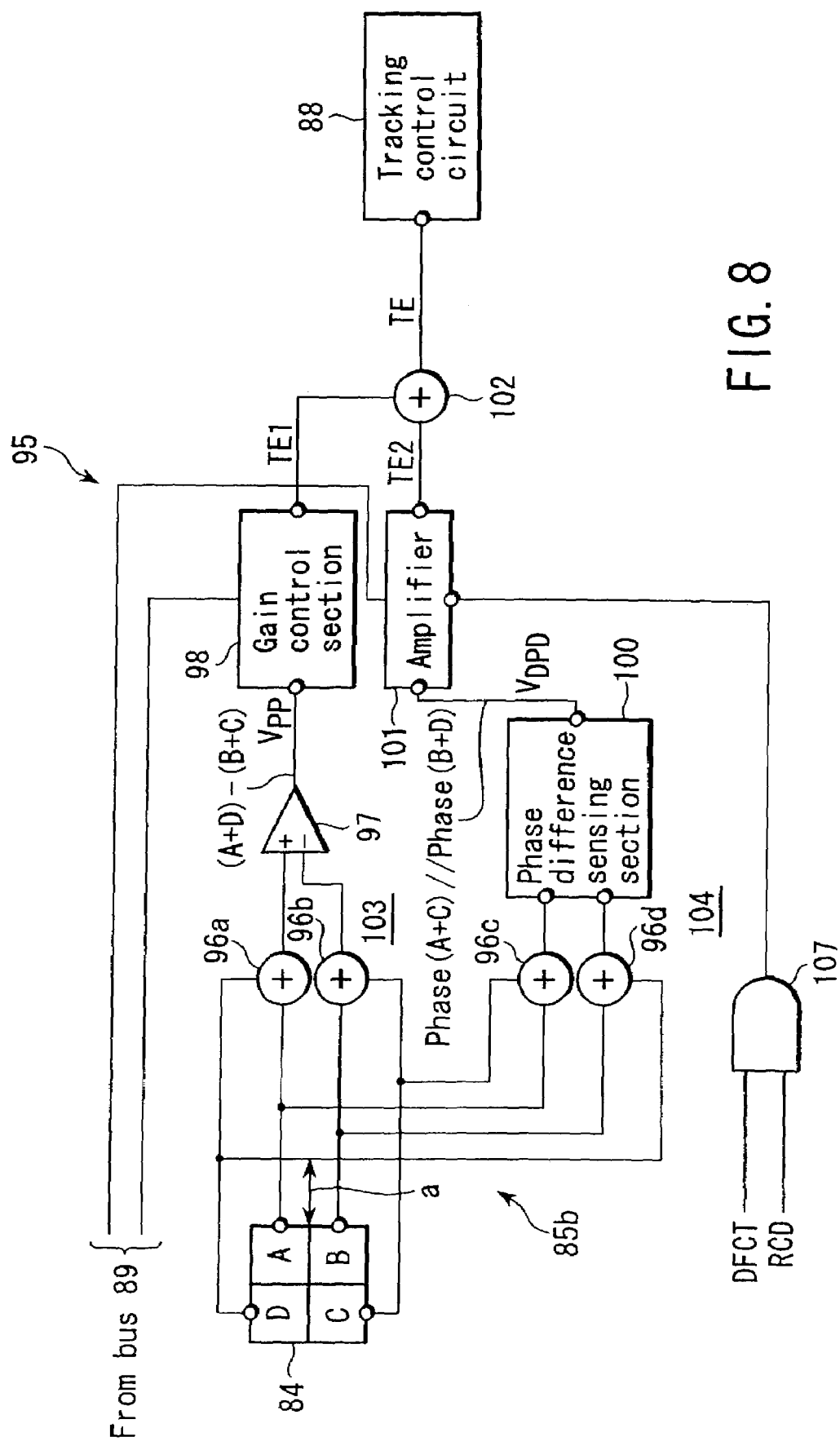
FIG. 8 is a block diagram showing the configuration of a tracking error signal generating circuit 85*b* according to a modification of the first embodiment.

FIG. 8 is a block diagram showing the configuration of a tracking error signal generating circuit 85b according to a modification of the first embodiment. In the tracking error signal generating circuit 85b, a control signal DFCT is ANDed with a recording/unrecording signal RCD at an AND gate 107, which supplies the result to an amplifier 101. That is, when one of the signal DFCT and the signal RCD is low, the AND gate 107 outputs a low signal.

In FIG. 5, although the tracking error signal TE2 obtained by amplitude-adjusting the DPD tracking error signal $V_{DPD}$ is 0V in the unrecorded area, the signal TE2 might actually include noise. When the tracking error signal TE2 includes noise, it becomes unstable. Therefore, the tracking error signal TE2 is forced to be 0V in the unrecorded area. This makes the tracking error signal TE more stable.

Figure 9:
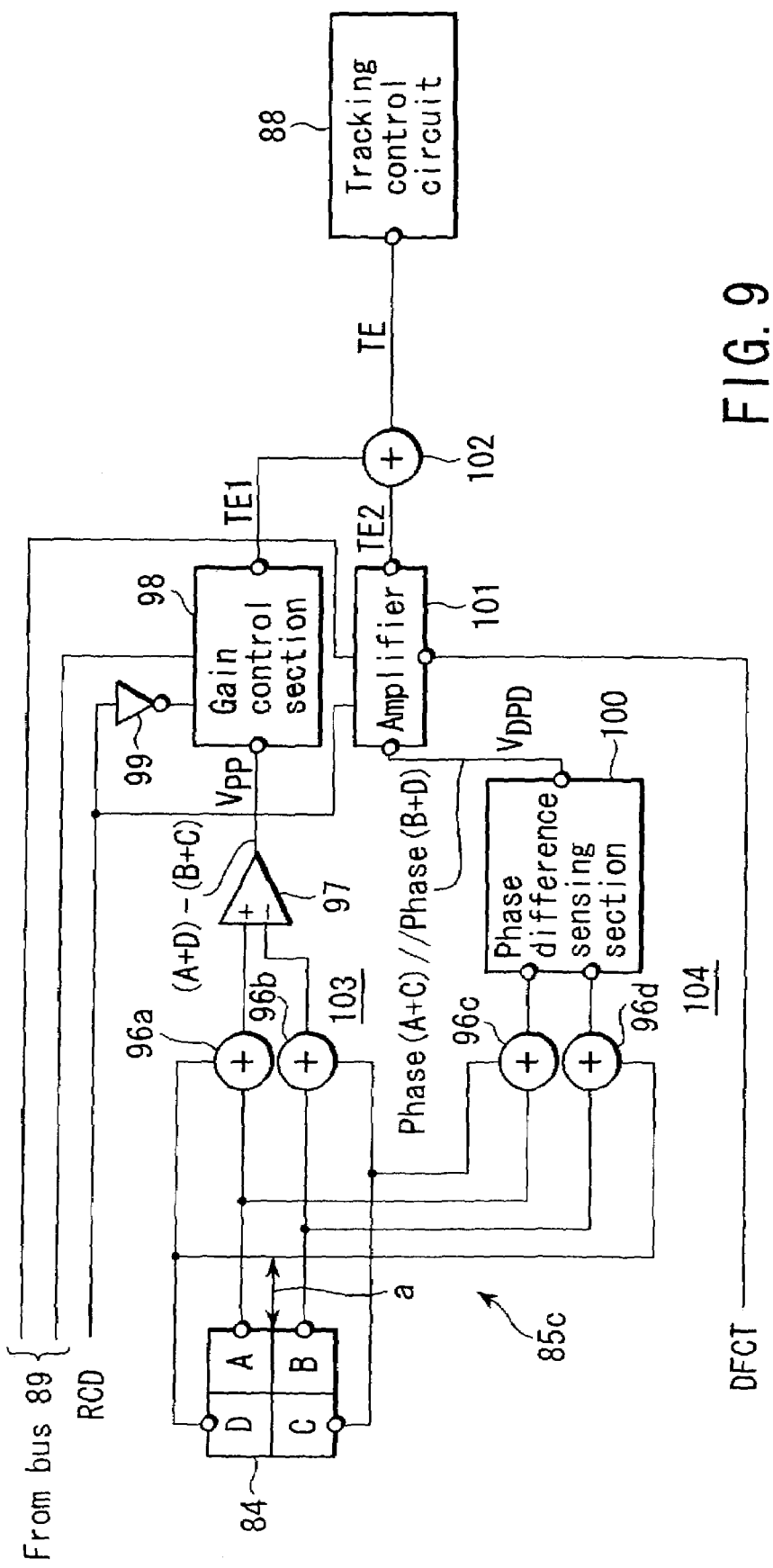
FIG. 9 is a block diagram showing the configuration of a tracking error signal generating circuit 85*c* according to another modification of the first embodiment.

FIG. 9 is a block diagram showing the configuration of a tracking error signal generating circuit 85c according to another modification of the first embodiment. In the tracking error signal generating circuit 85c, a recording/unrecording signal RCD is inputted to the amplifier 101. An inverting circuit 99 inputs an inverted signal of the signal RCD to the gain control section 98.

When the recording/unrecording signal RCD represents a recorded area (for example, when the signal RCD is high), the gain control section 98 mutes the tracking error signal $V_{PP}$. Thus, in the recorded area, tracking control is performed only by the DPD error signal $V_{DPD}$. When the recording/unrecording signal RCD represents an unrecorded area (or when the signal RCD is low), the amplifier 101 mutes the tracking error signal $V_{DPD}$. Thus, in the unrecorded area, tracking control is performed only by the PP error signal $V_{PP}$.

Consequently, it is possible to operate the recording medium stably even when a recorded area and an unrecorded area on the medium are searched at high speed.

Figure 10:
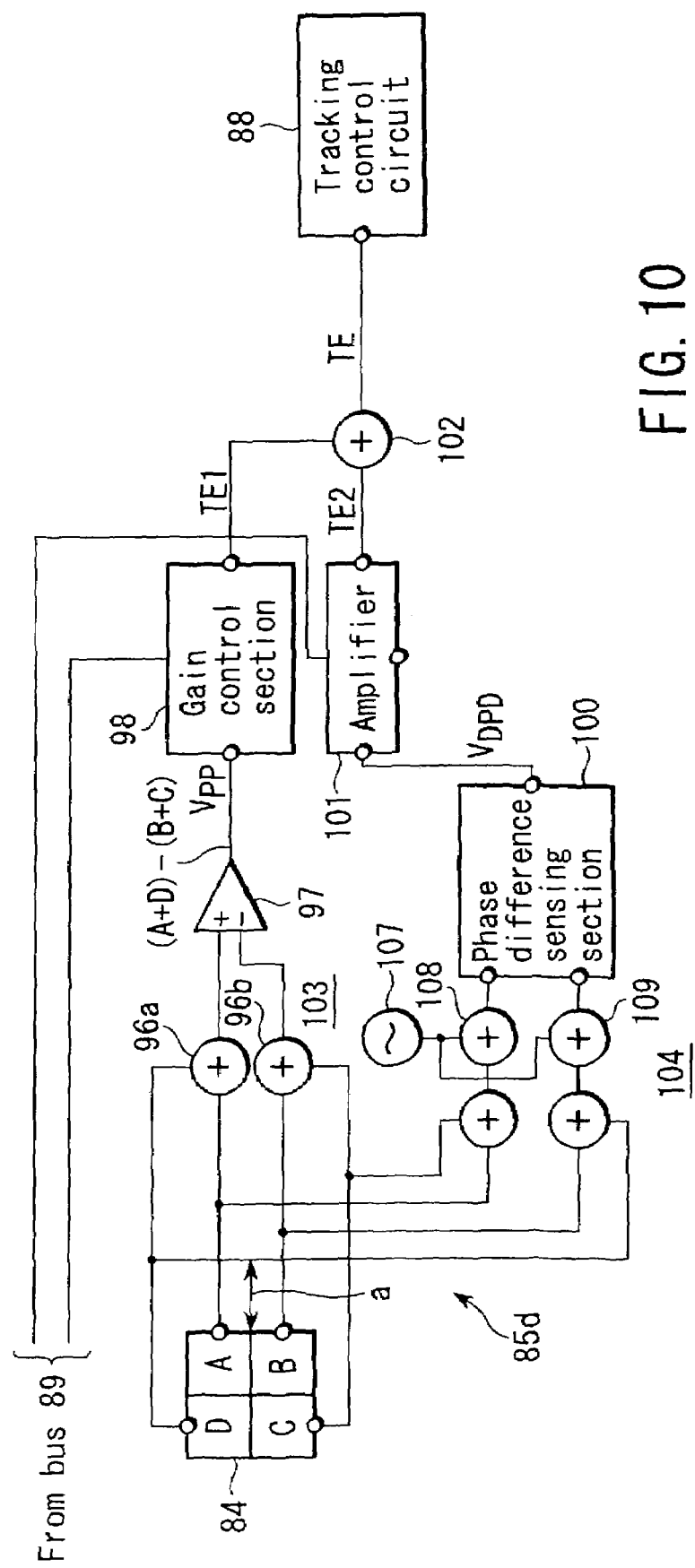
FIG. 10 is a block diagram showing the configuration of a tracking error signal generating circuit 85*d* according to still another modification of the first embodiment.

FIG. 10 is a block diagram showing the configuration of a tracking error signal generating circuit 85d according to a modification of the first embodiment. In the tracking error signal generating circuit 85d, the same signal of a constant frequency from an oscillator 107 is added to the comparison inputs to a phase difference sensing section 100 via adders 108, 109.

In this way, adding the same signal of a constant frequency enables the DPD signal to be muted automatically, when the RF signal to be supplied to the phase difference sensing section 100 disappears due to a flaw or the like in the disk surface. Since the DPD signal is muted when a portion where there is a flaw in the disk surface is scanned, a servo loop that prevents an erroneous operation, such as track skipping, from occurring can be constructed. In the modification, the defect sensing section 106 is not required.

FIG. 11 is a block diagram showing the configuration of a tracking error signal generating circuit 85e according to a second embodiment of the present invention. In the PP scheme, when the position of the object lens deviates from a desired position due to variations in the manufacture of pickups or a slight movement of the actuator, the optical axis shifts accordingly and therefore the spot on the optical sensor 84 shifts, with the result that the intensity of the light received by each detector changes. This causes an offset in the tracking error signal.

Figures 11A, 11B:
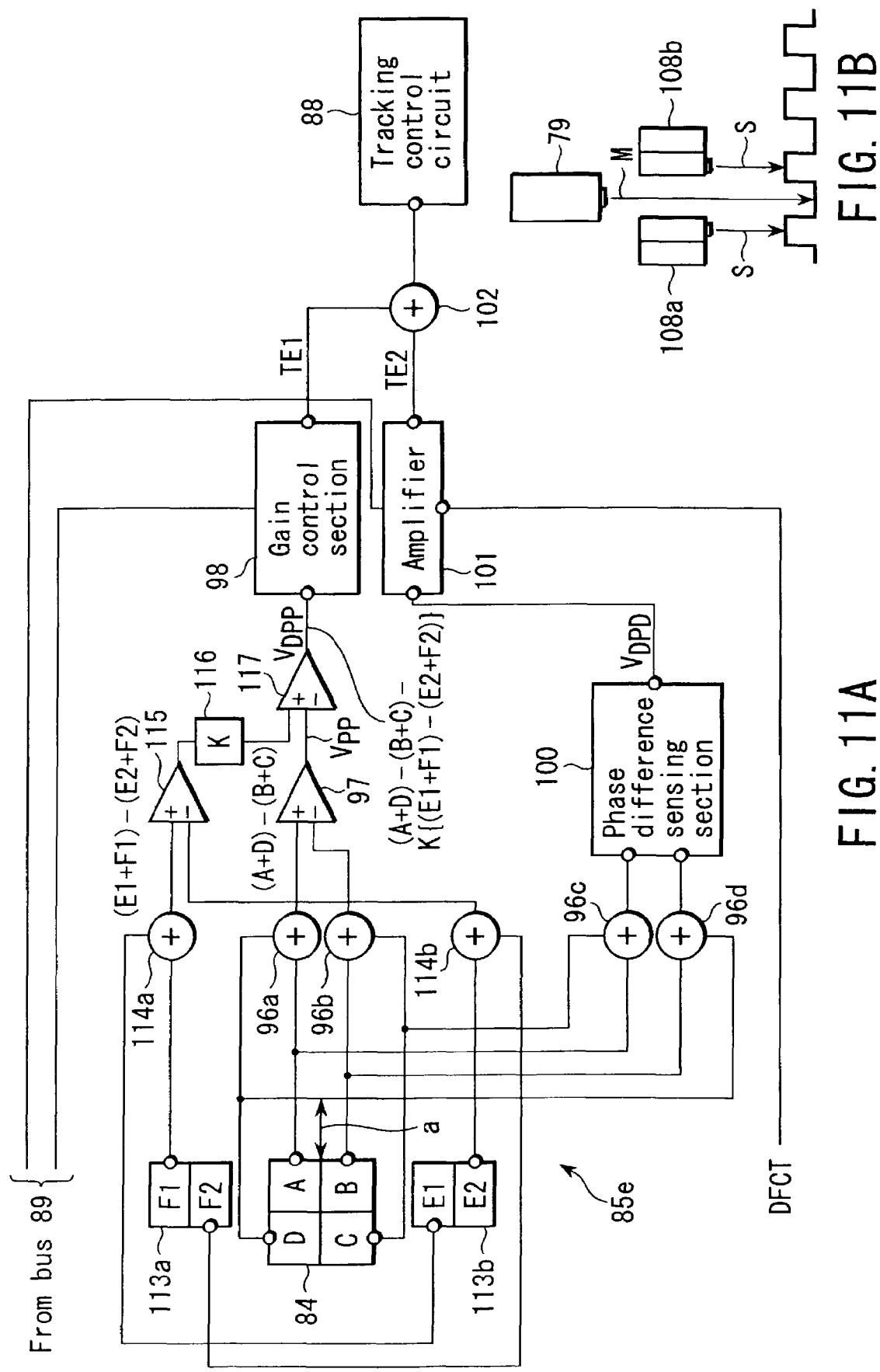
FIGS. 11A and 11B are a block diagram showing the configuration of a tracking error signal generating circuit according to a second embodiment of the present invention.

The tracking error signal generating circuit 85e uses a DPP (Differential Push Pull) scheme. As shown in FIG. 11B, on both sides of the main beam M generated from a laser diode 79, sub-beams S are generated by laser diodes 118a and 118b. The spots of the sub-beams S are projected onto adjacent tracks on both sides of the track scanned by the main beam M. Detectors F1, F2, E1, and E2 receive the sub-beams S, generate a PP signal from the sub-beams S, and cancel the offset in the PP signal generated from the main beam M by using the PP signal from the sub-beams S.

The sense outputs of the detectors F1 and E1 are added at an adder 114a. The sense outputs of the detectors F2 and E2 are added at an adder 114b. The add outputs of the adders 114a and 114b are subtracted at a subtracter 115. After the result is amplified at an amplifier 116 to a suitable amplitude, the amplified result is inputted to the subtracter 117. The PP tracking error signal $V_{PP}$ obtained at the optical sensor 84 shown in the first embodiment of FIG. 3 is also inputted to the subtracter 117. The subtracter 117 supplies the signal obtained by removing the offset from the PP tracking error signal $V_{PP}$, that is, the DPP tracking error signal $V_{DPP}$, to the gain control section 98. The operation of the remaining circuit block is the same as that of FIG. 3.

It is noted that the present invention is applicable to an optical disk apparatus used as one of an apparatus for reproducing information, and an apparatus for recording and reproducing information, by projecting a light beam onto an optical disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus used as one of an apparatus for reproducing information, and an apparatus for recording and reproducing information, by projecting a light beam onto an optical disk, said optical disk apparatus comprising:

an optical sensor which is composed of light sensing cells and is configured to receive the light reflected from an optical disk and outputs optical sense signals corresponding to said light received;

a differential phase detection (DPD) tracking error generating section which senses a phase difference between said optical sense signals outputted from said optical sensor and which generates a DPD tracking error signal from said optical sense signals;

a push pull (PP) tracking error generating section which senses a level difference between said optical sense signals outputted from said optical sensor and which generates a PP tracking error signal from said optical sense signals;

an adder which adds the DPD tracking error signal generated by said DPD tracking error generating section and the PP tracking error signal generated by said PP tracking error generating section and outputs the added tracking signal;

a tracking control section which performs tracking control using the added tracking signal supplied from said adder;

a defect sensing section which senses a defective part on said optical disk from a total add signal of said optical sensor; and an error signal mute section which is configured to mute the DPD tracking error signal supplied to said adder when said defect sensing section detects the defective part on said optical disk.

2. The optical disk apparatus according to claim 1, further comprising:

an unrecording sensing section which is configured to determine from the total add signal of said optical sensor whether said light beam is scanning a recorded area or an unrecorded area on said optical disk, wherein said error signal mute section mutes said DPD tracking error signal when one of the output signal of said unrecording sensing section and that of said defect sensing section becomes active.

3. The optical disk apparatus according to claim 2, wherein said unrecording sensing section senses the maximum amplitude of the total add signal of said optical sense signals, and determines that said light beam is scanning recorded area on said optical disk when the maximum amplitude drops below a predetermined threshold value.

4. The optical disk apparatus according to claim 1, further comprising:

a sub-beam generating section which generates sub-beams on both sides of said light beam serving as a main beam and projects the spots of the sub-beams onto adjacent tracks on both sides of the track scanned by said main beam; and an offset canceller which receives said sub-beams reflected from said optical disk, generates the PP signal from the sub-beams, and cancels an offset of the PP signal generated from said main beam by using the PP signal generated from the sub-beams.

5. The optical disk apparatus according to claim 1 further comprising:

an add section which adds an identical signal of a constant frequency to each optical sense signal inputted to said first tracking error generating section.

* * * * *